(12) United States Patent
Toyoda

(10) Patent No.: US 6,875,317 B1
(45) Date of Patent: Apr. 5, 2005

(54) WASTE TREATING METHOD

(76) Inventor: Jiro Toyoda, c/o Toyoda Techno Co., Ltd., 17-23, Kamiyoshida, 3-chome, Kokuraminami-ku, Kitakyushu-shi, Fukuoka 800-0201 (JP)

( * ) Notice: Subject to any disclaimer, the term of this patent is extended or adjusted under 35 U.S.C. 154(b) by 0 days.

(21) Appl. No.: 09/926,102

(22) PCT Filed: Feb. 28, 2000

(86) PCT No.: PCT/JP00/01155

§ 371 (c)(1),
(2), (4) Date: Aug. 31, 2001

(87) PCT Pub. No.: WO00/52113

PCT Pub. Date: Sep. 8, 2000

(30) Foreign Application Priority Data

Mar. 3, 1999 (JP) ............................................ 11/055798

(51) Int. Cl.[7] ............................ B09B 3/00; C10B 53/00; C10B 53/02
(52) U.S. Cl. ................................ 201/4; 201/21; 201/38; 202/94
(58) Field of Search ................................ 201/21, 4, 38, 201/29; 202/94, 95; 203/28, 92; 588/258

(56) References Cited

U.S. PATENT DOCUMENTS

| | | | | |
|---|---|---|---|---|
| 5,304,711 A | * | 4/1994 | Tanaka et al. | .............. 588/258 |
| 5,615,492 A | | 4/1997 | Raehse et al. | |
| 6,619,214 B2 | * | 9/2003 | Walker | ....................... 110/229 |

FOREIGN PATENT DOCUMENTS

| | | | |
|---|---|---|---|
| GB | 1 507 138 | | 10/1975 |
| GB | 1507 138 | * | 4/1978 |
| JP | 52-49668 | | 4/1977 |
| JP | 56-66610 | | 6/1981 |
| JP | 57-111000 | * | 7/1982 |
| JP | 63-93391 | | 4/1988 |
| JP | 6-99160 | | 4/1994 |
| JP | 7-185502 | | 7/1995 |
| JP | 7-313951 | | 12/1995 |
| JP | 07331248 | * | 12/1995 |
| JP | 8-2910 | | 1/1996 |
| JP | 8-511862 | | 12/1996 |
| JP | 9-323076 | | 12/1997 |
| JP | 9-323077 | | 12/1997 |
| JP | 10-202298 | | 8/1998 |
| JP | 11-128870 | | 5/1999 |
| JP | 111228870 | * | 5/1999 |
| JP | 11-209768 | | 8/1999 |
| JP | 11223476 | * | 8/1999 |
| JP | 11-223476 | | 8/1999 |
| JP | 2000-015635 | * | 1/2000 |

OTHER PUBLICATIONS

PCT Notification of Transmittal of copies of translation of the International Preliminary Examination Report.
Notification of Reasons for Refusal from the Japanese Patent Office dispatched on Nov. 13, 2001 (2 pages).

* cited by examiner

Primary Examiner—N. Bhat
(74) Attorney, Agent, or Firm—Westerman, Hattori Daniels & Adrian LLP

(57) ABSTRACT

Wastes mainly containing any one or two or more of raw garbage, waste lumber, paper diapers, waste plastics, and organic sludge discharged from the food industry, common houses, etc. are exposed to high-temperature steam of 510 to 900° C. in an oxygen-free state, preferably while being stirred, to be carbonized. Thereby, the amount of wastes is reduced safely and efficiently with no fear of generating harmful substances such as dioxin, and moreover the carbonized wastes can be reused effectively for applications to fuel or the like.

3 Claims, 5 Drawing Sheets

(a)

(b)

(a)

(b)

(a)

(b)

WASTE TREATING METHOD

TECHNICAL FIELD

The present invention relates to a disposal method for wastes such as raw garbage generated in processing foods such as livestock meat, fish meat, and vegetables in food plants or during and after cooking in common houses, restaurants, etc., waste lumber, paper diapers, and waste plastics.

BACKGROUND ART

Conventionally, wastes such as raw garbage generated in common houses, restaurants, food plants, or the like have been collected at a collection yard, and then disposed of by incineration using fuel or by decomposition using microorganisms. Other wastes have been disposed of by incineration.

However, in the disposal method using incineration and microorganisms, since the wastes are merely reduced in amount and subjected to land disposal etc., a problem arises in that wastes generated in large amounts cannot be reused effectively as a resource. Furthermore, in the disposal method by incineration, since plastic materials containing chlorine etc. are often contained in the wastes as packing materials, there is a fear that toxic substances such as dioxin Is produced in the incineration process of wastes, so that disposal for removing the toxic substances is needed separately. Also, in the disposal method in which wastes are decomposed by using microorganisms, a problem arises in that a long period of time is needed for disposal, so that it is difficult to dispose of a large amount of garbage effectively.

The present invention has been achieved in view of the above situation, and accordingly an object thereof is to provide a waste disposal method in which resources that can be used as a useful fuel can be obtained from wastes such as raw garbage generated in large amounts in food plants, common houses, etc. and organic wastes containing much water, and wastes can be disposed of safely and effectively without the generation of toxic substances.

DISCLOSURE OF THE INVENTION

In a waste disposal method in accordance with a first invention for attaining the above object, wastes mainly containing any one or two or more of garbage, used tires, waste lumber, paper diapers, waste plastics, organic sludge, and human or animal excrement are exposed to high-temperature steam in an oxygen-free state while being stirred as necessary to be carbonized. Thereby, even if source substances for dioxin are contained in the wastes, the amount of wastes such as garbage can be reduced safely and efficiently with no fear of generating harmful substances, and moreover the carbonized wastes can be reused effectively for applications to fuel or the like.

Also, in a waste disposal method in accordance with a second invention, organic wastes containing much water (for example, 60% or more of water) is exposed to high-temperature steam in an oxygen-free state to evaporate water and further to carbonize the wastes. Thereby, dairy products such as yogurt and milk or the like or organic wastes generated in the manufacture process of these dairy products, which have often been thrown away wastefully, can be reduced in amount efficiently to facilitate subsequent handling, and also the wastes having been carbonized can be reused usefully as fuel or carbon materials.

In the above-described inventions, the oxygen-free state means a state in which wastes are exposed to an atmosphere of a low oxygen concentration in which the surroundings of waste to be disposed of do not substantially burn due to heated or superheated high-temperature steam filled around the wastes. Also, as the high-temperature steam, superheated steam of 510 to 900° C. produced by further superheating saturated steam by a superheater is preferably used. If the temperature of the high-temperature steam is lower than 510° C., it takes much time to carbonize garbage etc., so that it is difficult to carry out disposal substantially. Therefore, the temperature of the high-temperature steam lower than 510° C. is unpreferable. Inversely, in order to increase the temperature of the high-temperature steam to a temperature exceeding 900° C., a large amount of energy is needed, and moreover there are imposed many restrictions such that the heat resistance of facility used must be increased.

It is preferable that the carbonized wastes be taken out into the air after the carbonized wastes are exposed to low-temperature steam (for example, 100 to 120° C.) to decrease the temperature thereof. Thereby, the wastes having been disposed of can be prevented from burning in the air.

Also, it is preferable that the gas after disposal be cooled, water and oil contained in the gas be recovered, and the recovered water be returned to a boiler for generating feed steam of the high-temperature steam. Thereby, the recovered water and oil can be reused effectively, and also a clean environment can be maintained without releasing substances causing pollution in the surroundings of disposal facility. The garbage preferably contains waste food mainly. In this case, the oil contained in waste food is recovered and refined, by which the oil can be reused effectively as fuel oil, cooking oil, or the like.

Furthermore, in the above-described inventions, it is preferable that the steam having been used for disposal of the wastes (exhaust gas) be supplied into a heating furnace for generating the high-temperature steam and be exposed to a high temperature of 800° C. or higher so that deodorization is accomplished. In this place, the heating furnace for generating the high-temperature steam includes a superheater, a steam generator, and other furnaces used for the method of the present invention. Also, the exhaust gas having been used for disposal of the wastes may be got into combustion flames of the heating furnace or, when a heater is used, it may be supplied to a steam inlet of the heater so as to be high-temperature steam having a temperature exceeding 800° C.

BEST MODE FOR CARRYING OUT THE INVENTION

First, a waste disposal facility to which a waste disposal method in accordance with embodiments of the present invention is applied will be described.

Figure 1:
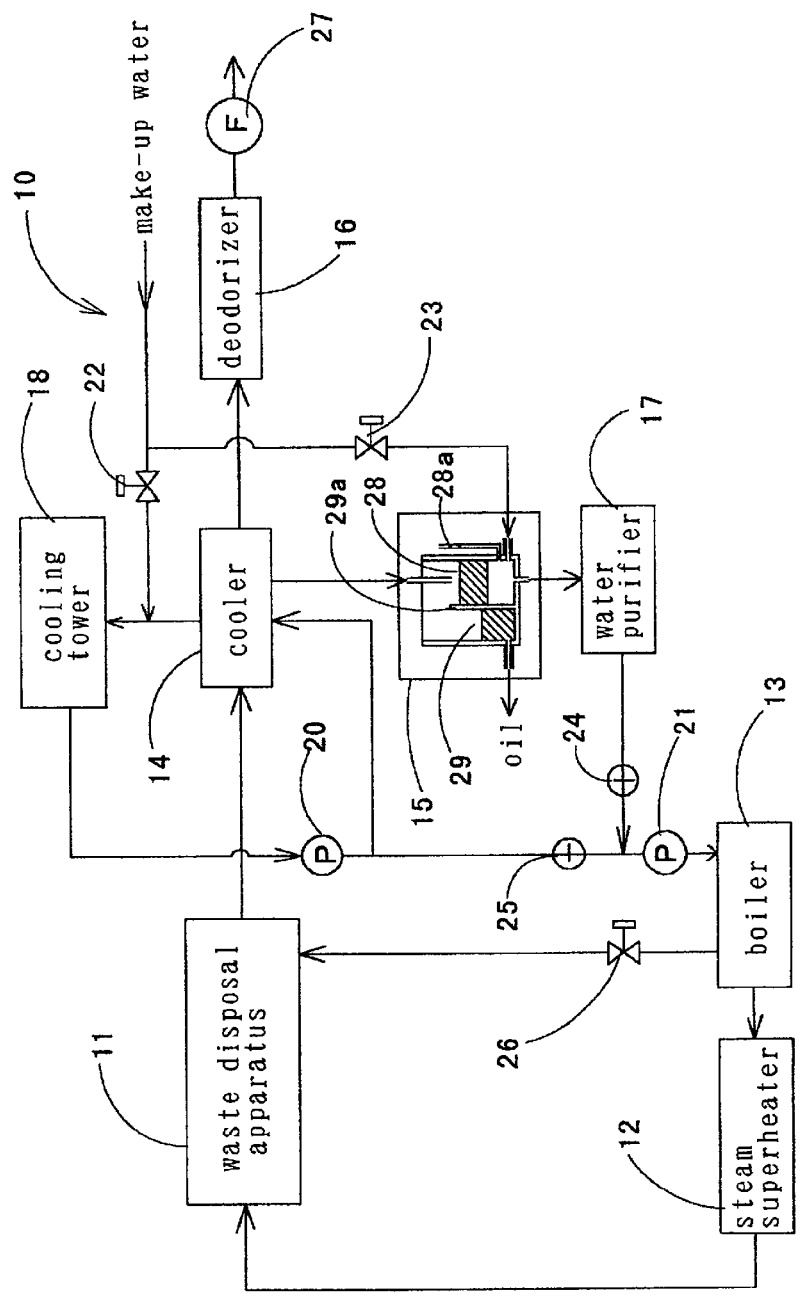
FIG. 1 is a schematic diagram showing a configuration of a waste disposal facility to which a waste disposal method in accordance with embodiments of the present Invention is applied.

As shown in FIG. 1, a waste disposal facility 10 includes a waste disposal apparatus 11 for carbonizing wastes mainly containing garbage by exposing them to high-temperature steam in an oxygen-free state while stirring them. The waste disposal apparatus 11 is supplied with high-temperature steam produced by superheating feed steam from a boiler 13 to a temperature in the range of 510 to 900 ° C. by using a steam superheater 12. Exhaust gas discharged from the waste disposal apparatus 11 is cooled by a cooler 14, and the liquefied matter and the gaseous matter of exhaust gas are disposed of by an oil separator 15 and a deodorizer 16, respectively. The liquefied matter is supplied to the boiler 13 as a water source for generating high-temperature steam after oil is separated by the oil separator 15 and purification is further effected by a water purifier 17. The cooling water used in the cooler 14 is cooled by a cooling tower 18, and then some or all of the cooling water is supplied to the cooler 14 as a cooling medium or to the boiler 13 as a supply water source as necessary.

This facility disposes of wastes in which a large amount of garbage generated in common houses are collected. Also, it can dispose of organic wastes containing much water (for example, 60% or more of water, sometimes 80% or more of water) generated in manufacturing dairy products such as yogurt and cheese and waste food generated in processing fish meat, livestock meat, or the like.

When the organic wastes containing much water is disposed of, water is evaporated rapidly by high-temperature steam and further the wastes are carbonized.

The following is a description of a waste disposal procedure using the above-described waste disposal facility 10.

First, make-up water is supplied to the boiler 13 through the cooling tower 18 and pumps 20 and 21 while the flow rate of water is regulated by using a flow control valve 22. In this place, between the pump 20 and the pump 21 and between the water purifier 17 and the pump 21, check valves 25 and 24 are provided, respectively, as necessary to prevent back flow. The make-up water may be fed to the boiler 13 directly without passing through the clean tower 18. Next, the boiler 13 is operated to generate a necessary amount of steam. The generated steam is heated into high-temperature steam of a predetermined temperature exceeding 500° C. and not higher than 900° C., preferably in the range of 510 to 900° C., further preferably in the range of 510 to 700° C., by using the steam superheater 12. The high-temperature steam and wastes are put into the waste disposal apparatus 11, and the wastes are exposed to the high-temperature steam of a temperature regulated as described above for a predetermined period of time of, for example, 10 to 60 minutes, preferably 20 to 50 minutes. Thereby, the volume or weight of wastes can be reduced to about one hundredth of the volume or weight before disposal, and the wastes can be carbonized. At this time, carbonization can be accomplished effectively by bringing the wastes into contact with the high-temperature steam in a stirred state. The carbonized wastes start burning in the high-temperature state when being brought into contact with the air. Therefore, before the wastes are discharged from the waste disposal apparatus 11, low-temperature steam, for example, steam of a temperature of 100 to 120° C. which is taken out of the boiler 13 through a flow control valve 26, is blown to the wastes to cool them.

The exhaust gas generated in the process of waste carbonization is cooled by the cooler 14, and is separated into a liquefied matter and a gaseous matter. The gaseous matter is released in the air by using an exhaust fan 27 after passing through the deodorizer 16 filled with an absorbent such as activated carbon. This gas can also be recovered so that It is used as fuel or auxiliary fuel for the boiler. On the other hand, the liquefied matter liquefied by the cooler 14 is supplied to the oil separator 15 having a separation tank 28, and is separated into oil with a smaller specific gravity and water with a larger specific gravity in the separation tank 28. Make-up water is supplied into the separation tank 28 from the bottom part thereof through a flow control valve 23 while the water level in the separation tank 28 is monitored by using a water level gauge 28a, by which the oil accumulating in the top layer is overflowed across the top end of a separation weir 29a, which divides the oil collected in an upper layer into the separation tank 28 and an oil tank 29 left and right, so that the oil can be recovered in the oil tank 29. The water recovered in the separation tank 28 is drawn out through the bottom part thereof, is purified by the water purifier 17 having an absorbent etc., and is returned to the boiler 13 via the pump 21. Thus, the components such as water and oil in the exhaust gas discharged from the waste disposal apparatus 11 can be reused effectively.

Figure 2:
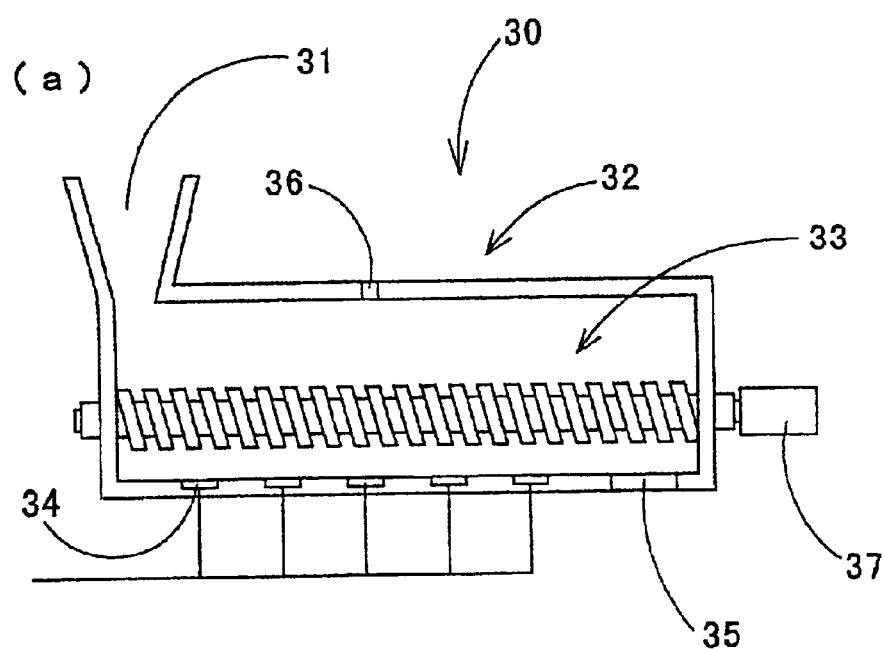
FIGS. 2(a) and 2(b) are a front sectional view and a plan view, respectively, of a waste disposal apparatus in accordance with a first embodiment.
Figure 2:
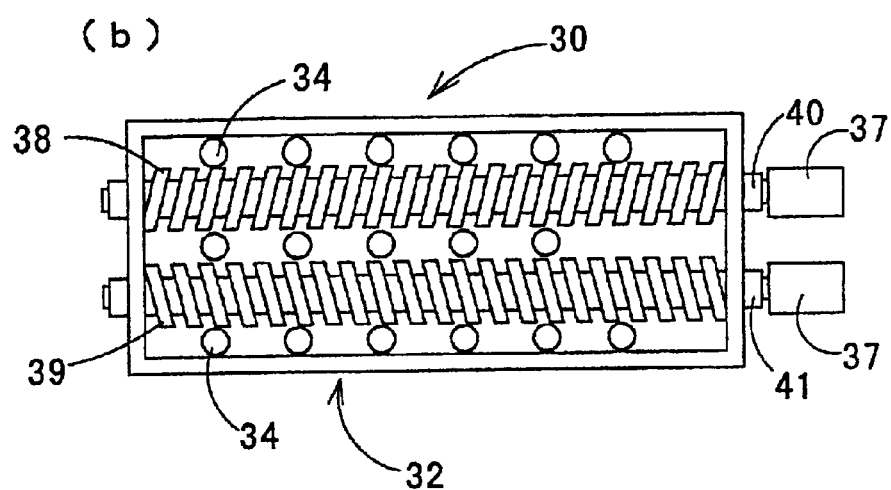

Next, first to third embodiments of waste disposal apparatus, which are further concreted embodiments of the above-described waste disposal apparatus 11, will be described. As shown in FIGS. 2(a) and 2(b), a waste disposal apparatus 30 of a first embodiment includes a disposal vessel body 32 into which wastes are charged through a supply port 31 at the upper part, a stirrer 33 for stirring and mixing the charged wastes, and high-temperature steam supply sections 34 which are provided at a plurality of locations at the bottom of the disposal vessel body 32 and are connected to the steam superheater 12. The following is a description of the construction of these elements.

The disposal vessel body 32 is a vessel that can make the interior thereof in a closed state after a predetermined amount of wastes is charged, and is provided with a discharge port 35 for discharging carbonized wastes at the bottom thereof. The disposal vessel body 32 is also provided with a gas discharge port 36 for discharging exhaust gas containing steam from the disposal vessel body 32 to the cooler 14 at the upper side thereof. The stirrer 33 has a pair of rotating shafts 40 and 41 having stirring blades 38 and 39, respectively, which are driven by two motors 37 and are arranged in parallel with each other. The stirring blades 38 and 39 are provided on the rotating shafts 40 and 41, respectively, in such a manner that the stirring blades 38 and 39 are installed at a tilt angle Inverted each other with respect to the axial direction of the rotating shafts 40 and 41 and a plurality of rotating blades 38 and 39 are arranged on the rotating shafts 40 and 41 at predetermined intervals, for example, at intervals of 10 to 50 mm. Therefore, when the rotating shafts 40 and 41 are rotated in the same direction, wastes in the disposal vessel body 32 move in the axial direction of each of the rotating shafts 40 and 41, and the movement direction is reverse to each other. Thereupon, a flow for stirring wastes evenly and thoroughly can be formed by effectively using a space in the disposal vessel body 32, and also high-temperature steam blown through the high-temperature steam supply sections 34 is supplied into the disposal vessel body 32 efficiently by the intervals of the rotating blades 38 and 39, so that carbonization can be accomplished satisfactorily. During the time when carbonization is carried out while high-temperature steam is blown in, exhaust gas is sent to the cooler 14 through the gas discharge port 36, and is disposed of by the oil separator 15 and the water purifier 17 to recover water and oil. After the carbonization is finished, cooling steam (for example, having a temperature of about 100 to 120° C.) is charged through a supply port, not shown, to decrease the temperature to a predetermined value, for example, 90 to 150° C., and wastes are discharged through the discharge port 35, whereby the carbonization can be finished.

Figure 3:
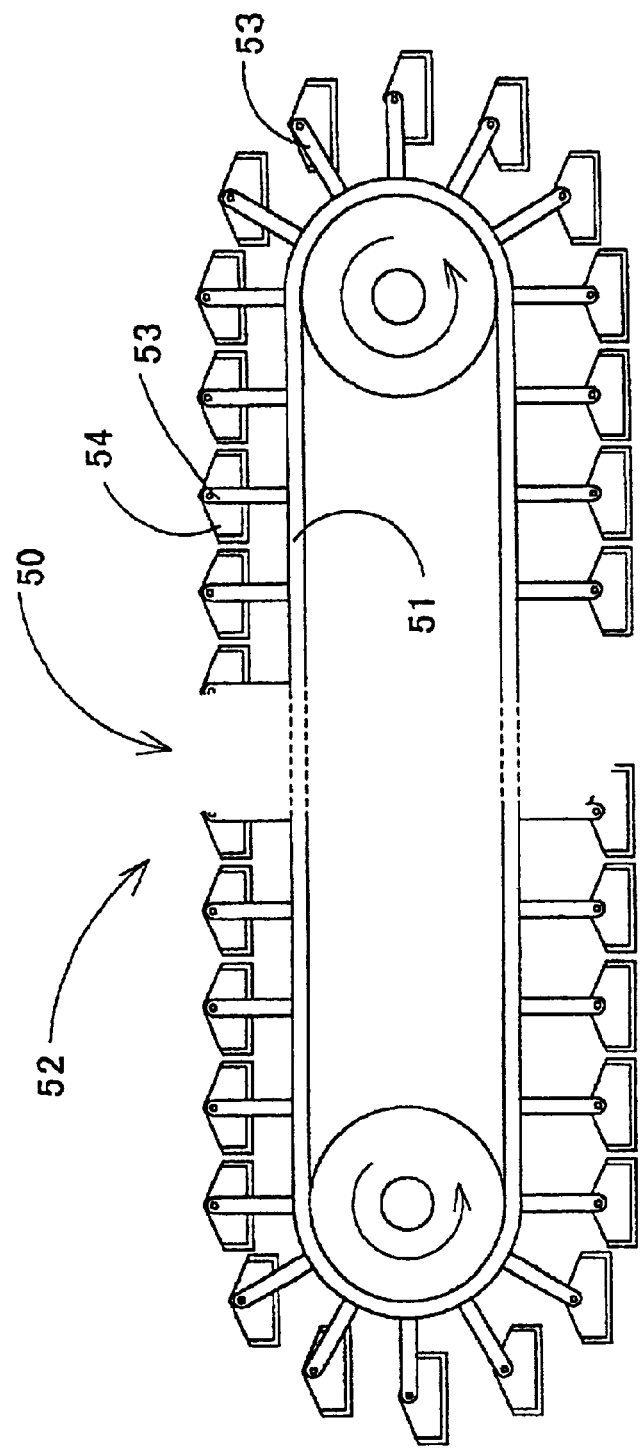
FIG. 3 is an explanatory view of a waste disposal apparatus in accordance with a second embodiment.

As shown in FIG. 3, a waste disposal apparatus 50 of a second embodiment includes a conveyor type transfer device 52 having a belt 51, a plurality of support members 53 provided on the belt 51 moving in the horizontal direction at a predetermined intervals, and buckets 54 each of which is hung by the support member 53 and into which wastes are put while the bucket 54 keeps its posture in a fixed direction. The waste disposal apparatus 50 can have a closed construction wholly or at a specific portion as necessary. Also, the waste disposal apparatus 50 is configured so that high-temperature steam of a predetermined temperature is blown along the waste charging direction by using the steam superheater 12, or the temperature in the apparatus can be controlled by blowing cooling steam etc. from the boiler 13. The bucket 54 and the belt 51 are constructed by many porous sections or meshes to cause steam to pass through easily, so that the wastes put into the bucket 54 and steam can effectively be brought into contact with each other. For the waste disposal apparatus 50 constructed as described above, the buckets 54 in which wastes have been put can be charged continuously from the charge side, and wastes having been cooled to a predetermined temperature can be taken out from the discharge side, so that large amounts of wastes can be disposed of.

Figure 4:
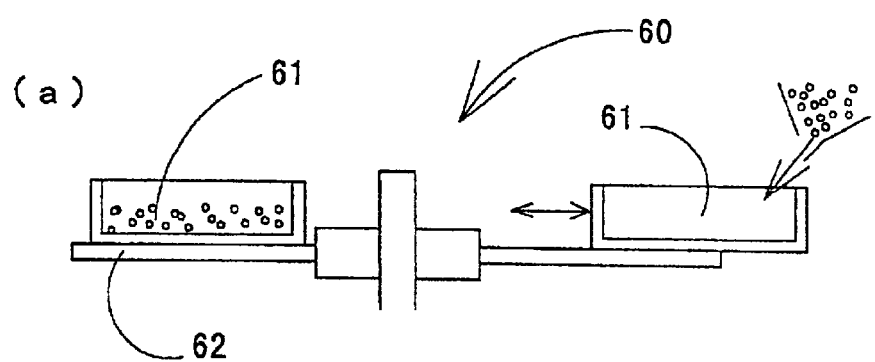
FIGS. 4(a) and 4(b) are a front sectional view and a plan view, respectively, of a waste disposal apparatus in accordance with a third embodiment.
Figure 4:
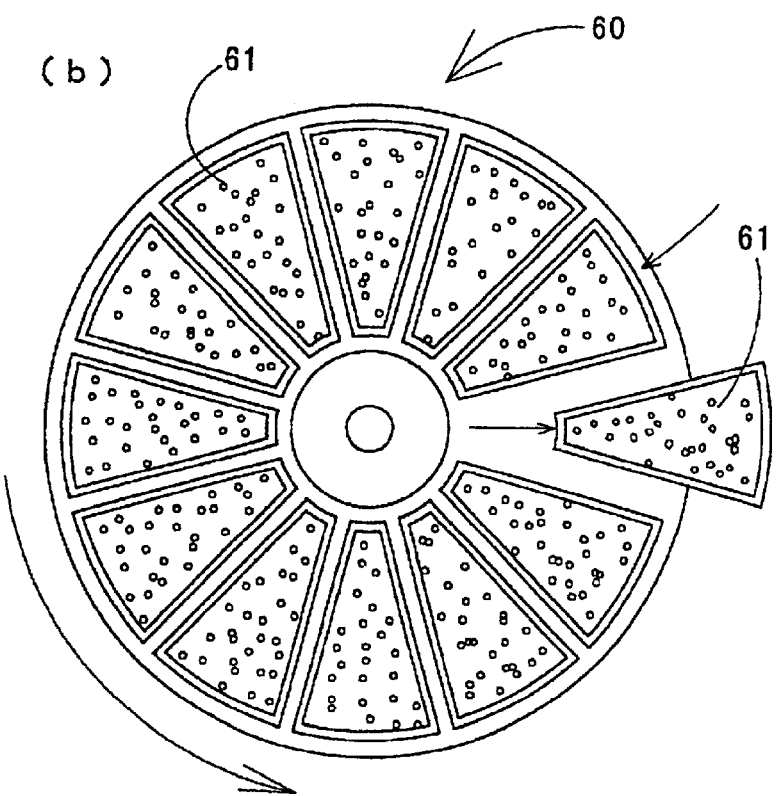

As shown in FIGS. 4(*a*) and 4(*b*), a waste disposal apparatus 60 of a third embodiment is substantially disk shaped as a whole so that substantially fan shaped trays 61 in which wastes are put can be revolved on the horizontal plane, and includes a rotary table 62 on which the trays 61 are put, and a drive unit, not shown, for driving the rotary table 62. The waste disposal apparatus 60 can have a closed construction wholly or at a specific portion as necessary. Thereupon, the temperature of every portion on the rotary table 62 can be controlled so as to be a predetermined value by blowing high-temperature steam having been regulated to a predetermined temperature and a predetermined amount by the steam superheater 12 along the revolving direction of the tray 61 configured by many porous sections or meshes, or by blowing cooling steam etc. from the boiler 13. For example, the rotating motion period and the standstill period are repeated alternately, and during the standstill period, every portion are closed completely and high-temperature steam of a predetermined temperature is supplied, by which disposal can be carried out along a desirable heating and cooling pattern. For the waste disposal apparatus 60 constructed as described above, the trays 61 in which wastes are put are charged intermittently from the charge section, are revolved substantially one turn, and are cooled to a predetermined temperature from the discharge section on the upstream side. By taking out the trays 61 in which wastes are put, the entire apparatus can be operated continuously.

Figure 5:
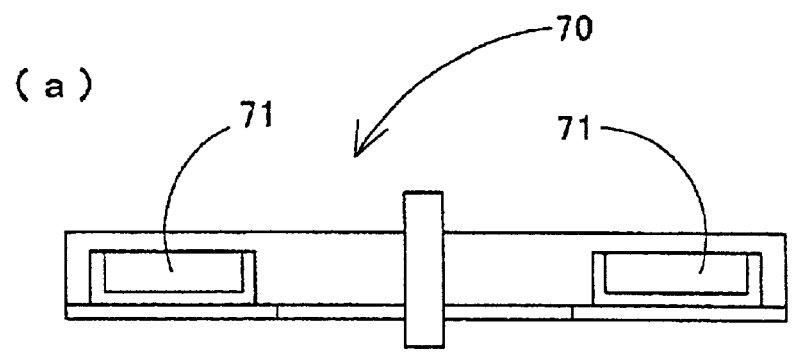
FIGS. 5(a) and 5(b) are a front sectional view and a plan view, respectively, of a waste disposal apparatus In accordance with a fourth embodiment.
Figure 5:
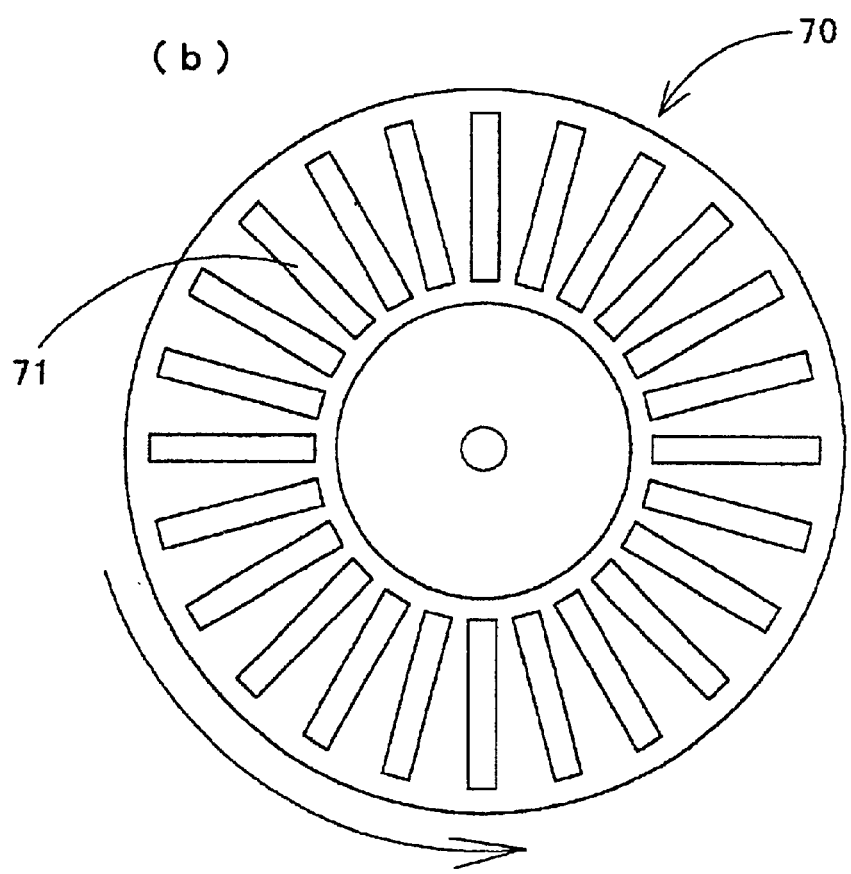

FIGS. 5(*a*) and 5(*b*) show a waste disposal apparatus 70 of the fourth embodiment, which is of a revolution type like the third embodiment. These figures show an example in which a rectangular tray 71 is used. In this case, since the tray 71 has a rectangular shape, the waste disposal apparatus 70 has advantages that the trays 71 can be stored in a compact manner, and the charging and discharging of wastes into and from the tray 71 can be performed easily.

Although exhaust gas from the waste disposal apparatus is released in the air by using the deodorizer 16 in the above-described embodiments, the configuration can be such that the deodorizer 16 is omitted, and exhaust gas from the cooler 14 is heated to a temperature of 800° C. by being mixed directly with the exhaust gas from the boiler 13 and the steam superheater 12 to decompose the odor and then is released in the air. Also, when exhaust gas from the waste disposal apparatus passes through the cooler 14, the temperature thereof decreases. Therefore, the exhaust gas having passed through the cooler 14 is exposed to a temperature of 800° C. or higher by being mixed with the exhaust gas from the boiler 13 and the steam superheater 12 in the high-temperature state to decompose the odor so that it can be released in the air. In this case, high-temperature exhaust gas from the waste disposal apparatus is supplied directly to the primary side of the steam superheater 12 and is superheated to an odor decomposition temperature (usually, a temperature of 800° C. or higher). Thereby, the superheated steam can be used further in the waste disposal apparatus, and the effective use of heat can be achieved effectively.

The above is a description of the embodiments of the present invention, and the present invention is not limited to these embodiments, and all changes that do not depart from the gist of the present invention are embraced in the scope of the present invention. For example, although the case where the present invention is applied to wastes mainly containing garbage has been described in the aforementioned embodiments, the present invention can be applied to wastes other than garbage, that is, wastes mainly containing any one or two or more of used tires, waste lumber, paper diapers, waste plastics, organic sludge, and human or animal excrement. Also, the present invention can be applied effectively to organic wastes containing much water (for example, 60% or more of water) such as dairy products such as yogurt and milk.

INDUSTRIAL APPLICABILITY

In the waste disposal method in accordance with the present invention, since wastes are exposed to high-temperature steam of 510 to 900° C. in an oxygen-free state to be carbonized, there is no fear of generating harmful substances even if the wastes contain source substances for dioxin etc. Therefore, the amount of wastes such as garbage can be reduced safely and efficiently, and moreover the carbonized wastes can be reused effectively as carbon materials for fuel or activated carbon.

Especially, when wastes are exposed to high-temperature steam in an oxygen-free state while being stirred, the heating efficiency increases, so that the wastes can be disposed of for a short period of time.

Also, when organic wastes containing much water as in the case of dairy products such as yogurt and milk or as in the case of organic wastes etc. generated in the manufacture process of these dairy products, which have often been thrown away wastefully, are exposed to high-temperature steam in an oxygen-free state to evaporate water and further carbonize the wastes, the amount of the wastes can be efficiently reduced to facilitate subsequent handling, and also the wastes having been subjected to disposal can be reused finally as fuel or carbon materials.

When the wastes having been exposed to high-temperature steam and carbonized as described above are exposed to low-temperature steam, since the temperature of carbide (carbonized wastes) decreases, so that there is no fear that the carbide starts burning even if it is exposed to the air. Furthermore, since the carbide scarcely contains water even after it is exposed to low-temperature steam to decrease the temperature thereof, the carbide, which is the product, need not be dried.

Furthermore, by cooling down the gas generated during the waste being disposed of, water and oil contained in the gas are recovered, and also the recovered water is returned to the boiler for generating feed steam of high-temperature steam, so that the recovered water and oil can be reused effectively as a resource, and substances causing pollution are not released in the surroundings of the disposal facility, which enables to maintain environment clean in disposing of wastes.

Moreover, when the steam having been used for the disposal of wastes is supplied into a heating furnace for generating high-temperature steam to be used for disposal, and is exposed to a high temperature of 800° C. or higher so that deodorization is accomplished, an offensive odor is not given off in the surroundings.

What is claimed is:

1. A waste disposal method, characterized in that wastes mainly containing any one or more of raw garbage, waste lumber, and paper diapers are exposed to high-temperature steam in an oxygen-free state to be carbonized, and the wastes having been carbonized by being heated by said high-temperature steam are taken out into the air after said carbonized wastes are exposed to low-temperature steam to decrease the temperature thereof, said wastes being carbonized using said high-temperature steam of 510 to 900° C. produced by further superheating feed steam from a boiler with a steam superheater, said low-temperature steam used to decrease the temperature of said carbonized wastes having a temperature of 100 to 120° C., said steam having been used for disposal of said wastes being deodorized by being mixed with exhaust gas from the boiler or the steam superheater, and by being exposed to a high temperature of 800° C. or higher.

2. A waste disposal method characterized, in that organic wastes containing 60% or more of water are exposed to high-temperature steam in an oxygen-free state to evaporate water and further to be carbonized, and the wastes having been carbonized by being heated by said high-temperature steam are taken out into the air after said carbonized wastes are exposed to low-temperature steam of 100 to 120° C. to decrease the temperature thereof, said wastes being carbonized using said high-temperature of 510 to 900° C. produced by further superheating feed steam from a boiler with a steam superheater.

3. A waste disposal method, characterized in that organic wastes mainly containing any one or more of organic sludge, human excrement, and animal excrement are exposed to high temperature steam of 510 to 900° C. in an oxygen-free state to be carbonized, and the wastes having been carbonized by being heated by said high-temperature steam are taken out into the air after said carbonized wastes are exposed to low temperature steam to decrease the temperature thereof, said low-temperature steam used to decrease the temperature of said carbonized wastes having a temperature of 100 to 120° C., said wastes being carbonized using said high-temperature steam produced by further superheating feed steam from a boiler with a steam superheater, said steam having been used for disposal of said wastes being deodorized by being mixed with exhaust gas from the boiler or steam superheater, and by being exposed to a high temperture of 800° C. or higher.

* * * * *